United States Patent [19]

Komadina et al.

[11] Patent Number: 4,591,710
[45] Date of Patent: May 27, 1986

[54] AMBIENT LIGHT AND ELECTROMAGNETIC NOISE REDUCTION CIRCUIT

[75] Inventors: Bruce M. Komadina, Champaign; Vladeta D. Lazarevich, Bondville, both of Ill.; August H. Beining, Fullerton, Calif.

[73] Assignees: Electro Mechanical Systems, Inc., Champaign, Ill.; Hughes Aircraft Company, Los Angeles, Calif.

[21] Appl. No.: 512,821

[22] Filed: Jul. 11, 1983

[51] Int. Cl.$^4$ ............................................. G01V 9/04
[52] U.S. Cl. .................................. 250/221; 250/214 C
[58] Field of Search .................... 250/221, 222.1, 208, 250/209, 214 R, 214 C; 367/901; 455/617, 618, 619

[56] References Cited

U.S. PATENT DOCUMENTS

| | | | |
|---|---|---|---|
| 3,576,452 | 4/1971 | Smith | 250/214 C |
| 4,243,879 | 1/1981 | Carroll et al. | 250/221 |
| 4,335,316 | 6/1982 | Glanz et al. | 250/221 |
| 4,384,201 | 5/1983 | Carroll et al. | 250/221 |

OTHER PUBLICATIONS

"Electronic Compensation for Dirty Lenses in Opto-transducers", Design Engg. (Mar. 1980) p. 17.
"Optischer Empfanger mit Kompensation der Grundhelligkeit", Radio Fernsehen Elektronik, vol. 26, No. 16, Aug. 1977, p. 543.
"Zero Based Photodiode Rejects Digital Noise,", R. Perish, Electronic Design, vol. 31, No. 8 (Apr. 14, 1983) p. 168.
"Photoelectric Detector", Kusano et al., Pat. Abstracts of Japan, vol. 6, No. 156, (P-135) (1034) (Aug. 17, 1982), JP, A,57-73635.
"AGC-Controlled Light-Beam Detector Ignores Ambient Light Changes", Bushong, Electronic Des., vol. 29, No. 19 (Sep. 1981) pp. 188-190.

*Primary Examiner*—David C. Nelms
*Attorney, Agent, or Firm*—Robert Thompson; Anthony W. Karambelas

[57] ABSTRACT

A circuit for reducing noise and increasing the reliability of touch panels involves the use of a supplemental noise or electromagnetic interference pickup lead which extends generally coextensively with the parallel connected outputs from a series of successively coupled photodetectors and a high pass filter for substantially reducing the noise signals created by variations in the level of ambient light. When the photodetectors output is connected to one of the inputs of a differential operational amplifier, and the compensating pickup lead is connected to the opposite polarity other input, the noise is substantially cancelled out, and a cleaned-up photodetector pulse is provided. A pulse forming circuit squares up the photodetector output signal pulse; and a hysteresis type storage or buffer 15 circuit is employed to indicate the presence or absence of photodetector output signals, from successive photodectors, thereby indicating whether or not the light beams are interrupted either fully or partially.

19 Claims, 8 Drawing Figures

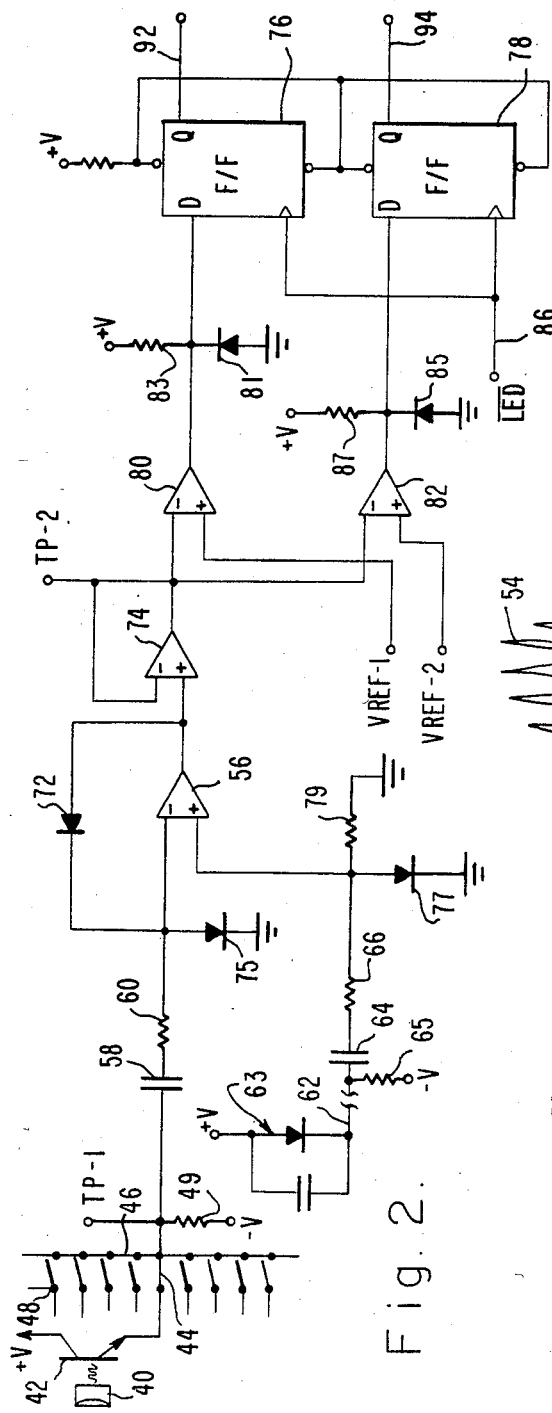

AMBIENT LIGHT AND ELECTROMAGNETIC NOISE REDUCTION CIRCUIT

BACKGROUND OF THE INVENTION

1. Field of the Invention

This invention relates generally to detection circuits that can be used with optical touch panels and more particularly to a circuit which compensates for the noise signals created by ambient light variations and by electromagnetic interference.

2. Description of the Prior Art

Prior arrangements which have been proposed for touch panels are disclosed in U.S. Pat. No. 3,764,813, granted Oct. 9, 1973, U.S. Pat. No. 3,775,560, granted Nov. 27, 1973, and U.S. Pat. No. 4,198,623, granted Apr. 15, 1980. In systems of the type disclosed in the above patents, the interruption of closely spaced beams of light is employed to locate the coordinates of a point which is being pointed to on the invisible opto-matrix; and semiconductor switching circuits are often employed to sequentially turn on successive pairs of opposing photosource and photodetectors, to thereby scan across the face of the display, both horizontally and vertically. A common output circuit is connected from all of the photodetectors sampling switches which are sequentially energized to sense whether or not there is anything, such as a finger, blocking one or more of the light beams. The photodetector output circuit normally extends substantially along two edges of a circuit board, and therefore, can be subject to electromagnetic interference, from voltages, currents and radiation typically within the proximity of the touch panel housing. In addition, the photodetectors are affected by variations in the ambient lighting conditions where the unit is located, and these may also adversely affect the operation of the unit.

Heretofore, one approach disclosed in U.S. Pat. No. 4,243,879, granted on Jan. 6, 1981, used a digital sample and hold technique to mitigate the effects of variations in the level of ambient light by sampling ambient light level as seen by the phototransistor just before the photodetector is energized. While some protection was provided for variation in ambient light it does not compensate for electromagnetic interference.

Accordingly, it is a principal object of the present invention to provide an improved photodetection circuit which is more reliable and more readily compensates for both electromagnetic interference and ambient light variations than those which have been employed heretofore.

SUMMARY OF THE INVENTION

In accordance with one important aspect of the invention, the photodetector output circuit is coupled to one input of a differential amplifier circuit, and a noise signal compensation circuit extending substantially coextensively with the photodetector output circuit is connected to the opposite polarity input to the differential amplifier. Accordingly, the desired photodetector output signals are transmitted through the differential amplifier, while the noise signals which are picked up substantially equally both by the photodetector output circuit and the compensating circuit, cancel one another out to substantially eliminate the noise signal component on the output signal of the differential amplifier.

In accordance with another aspect of the invention, the input from the photodetector circuit is fed through a high pass filter circuit to substantially eliminate the relatively low frequency effects of the more slowly changing variations in ambient lighting, while transmitting the relatively higher frequency pulses produced by the gating of light impulses from selected successive photodetectors. By eliminating the need to compensate for variations in ambient light each time a photodetector output is sampled, it is possible to operate the system at a much higher scan rate. Consequently larger detector arrays can be built and faster response time can be attained.

In accordance with still another aspect of the invention, the differential amplifier may be provided with a diode in the feedback circuit so that the desired photodetected signal pulses of one polarity are amplified at high gain levels; whereas pulses of the opposite polarity are not amplified, in accordance with the feedback characteristics of the diode.

A still further aspect of the invention involves the use of hysteresis type output circuitry for the photodetected pulse sensing circuits, which only changes state when a change is encountered when going from a beam transmission to a beam interruption, or vice-versa, as successive pairs of light emitters and photodetectors are scanned across the face of the touch panel faceplate.

One advantage resides in the reference sample hysteresis circuit wherein the data sampled from the position of the finger or other object which interrupts the beam is smoothed in spite of slight irregular movement (such as tremors) of the finger, or slight variation in the signal level due to changes in ambient light, or electromagnetic noise. Consequently, more stable data is obtained on the position of the finger.

Other advantages of the invention includes significant reduction in sensitivity to ambient lighting noise and increased reliability as a result of noise compensation by a substantial elimination of the noise component from the photodetector output signal. As a result, relatively inexpensive light emitting diodes and phototransistors may be employed to significantly reduce the overall cost of the touch panel.

Another advantage is that the higher attainable signal to noise ratio permits the use of smaller photoemitter and photodetector devices since it is not necessary to overpower the ambient light level because the devices are capable of operating at a level below the intensity of the ambient light.

Other objects, features, and advantages of the invention wil become apparent from a consideration of the following detailed description and from the accompanying drawings.

BRIEF DESCRIPTION OF THE DRAWINGS

FIG. 2 is a circuit diagram of a preferred embodiment illustrating the principles of the present invention;

FIG. 3 is idealized plot of a photodetector current pulse during gating and the receipt of a beam of illumination;

FIG. 4 shows a typical noise signal component which might be superimposed upon a photodetector output pulse in a touch panel unit of the type shown in FIG. 1;

FIG. 5 shows an idealized amplified and limited pulse derived from the photodetector output pulse of FIG. 3;

FIG. 6 is a representation of an actual output pulse as amplified and limited, with the low level of residual noise following compensation in accordance with the present invention;

DETAILED DESCRIPTION OF INVENTION

Figure 1:
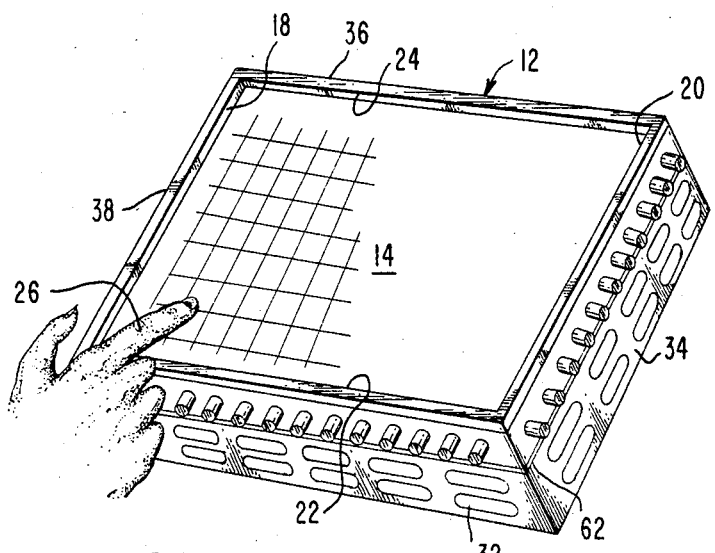
FIG. 1 represents a touch panel unit of the type to which the present invention relates.

Referring more particularly to the drawings, FIG. 1 is an overall view of a touch panel unit 12 which has a faceplate 14. In addition, a series of photoemitters such as light emitting diodes are located, for example, at one side 18 of the faceplate to direct beams of infrared light across the faceplate 14 to photodetectors such as phototransistors located at the opposite edge 20 of the faceplate 14. Similarly, an additional set of light emitting diodes may be provided to direct illumination from the lower edge 22 of the faceplate upwardly to phototransistors located at the upper edge 24 of the faceplate. Preferably the pairs of light emitting diodes and phototransistors are energized sequentially to scan across the faceplate both in the horizontal direction and in the vertical direction such that they intersect to form a grid pattern. The light from each light emitting diode is directed across the faceplate to impinge on the opposing phototransistors locating the coordinates of where a finger 26 may be pointing, for example, either to a switch point or a portion of a display. Of course, the interruption of one or more of the beams in each direction, serves to locate the position of the finger 26.

A set of four circuit boards 32, 34, 36 and 38 may serve to mount the light emitting diodes and the phototransistors, along with their associated electronic circuitry. In practice, the opposing pairs of light emitting diodes and phototransistors are switched on and off concurrently, with sequential energization of the successive pairs of phototransistors and light emitting diodes serving to scan across the face of the faceplate in both the horizontal and vertical directions. In practice, the output from the phototransistors may be connected in parallel to detection and processing circuits, with the particular phototransistor from which a pulse is being received being identified by the timing of the switching circuitry which sequentially turns on the paired light emitting diodes and phototransistors.

Reference will now be made to the circuit diagram of FIG. 2 which includes a circuit illustrating the principles of the present invention. More specifically, in FIG. 2, a phototransistor 42 is shown connected by switch 44 to a phototransistor output lead 46. A plurality of additional switches 48 are also shown, and are representative of a series of parallel semiconductor switches which sequentially gate a series of parallel phototransistors to their conducting states, simultaneously with the energization of the opposite paired light emitting diode 40 which directs light onto the phototransistors 42. The sequential energization of the switch 44 and the many switches indicated at 48, and their precise timing, identifies for the system which phototransistor is generating (or not generating) an output pulse 52 of FIG. 3. The current associated with this pulse 52 flows through the load resistor 49 which has one end connected to a reference voltage −V. This causes the voltage level at the end of the load resistor 49 to rise producing the output pulse 52.

FIG. 3 shows an idealized positive going output pulse such as might be recovered from the phototransistor 42 when the beam is not interrupted. However, as mentioned above, because the phototransistor output lead 46 extends a considerable distance across the printed circuit board, for example printed circuit boards 34 and 36 of FIG. 1, a great deal of electromagnetic noise is picked up and added to the phototransistor output signal. This is indicated for example in FIG. 4 of the drawings where the phototransistor signal 52 may be relatively small, in the order of ten to fifteen millivolts, while the noise signals 54 may be substantially greater and may for example be even 100 to 150 millivolts.

In order to substantially cancel out these undesired noise signals, a differential operational amplifier 56 is used with the signal from the phototransistor output lead 46 fed through a high pass filter circuit, which includes load resistor 49, series capacitor 58 and resistor 60, to the negative (−) input terminal of the amplifier 56; and a compensating signal equivalent to the noise signal components picked up on the noise compensating pickup lead 62 is coupled to the positive (+) input terminal of operational amplifier 56 through a high pass filter circuit which includes load resistor 65 and series connected capacitor 64 and resistor 66.

The compensation pick-up lead 62 indicated schematically at 62 in FIG. 1 is a long electrical conductor extending for substantially the full length of the circuit boards 34 and 36, commensurate in extent with the phototransistor output circuit 46, as indicated at the left in FIG. 2. The lead 62 can be in the form of a wire, a printed circuit, plating, planar etch, etc. The end of the lead 62 has a load termination circuit 63 equivalent to a phototransistor 42 and a switch 48 coupled to it. This equivalent load circuit 63 can be in the form of a capacitor and a diode connected in parallel with one another. Accordingly, the noise signals picked up on lead 62 results in current flow through load resistor 65 which will be substantially the same as the electromagnetic noise signals on phototransistor output lead 46. As a result of the two equivalent and balanced input circuit branches to the operational amplifiers 56, these two sets of noise signals will substantially cancel one another out, while leaving only the desired characteristics of the phototransistor output signal 52 to be amplified and shaped by the time it arrives at test point TP-2 as shown in FIGS. 5 and 6.

It is also noted that the high pass filter including series capacitor 58, and resistor 60 and the load resistors connected in shunt to the capacitor discriminates against the relatively slowly changing levels of ambient light which will be received by the photodiodes and which might otherwise vary the output signal from the operational amplifier 56. For example, in one embodiment the high pass filter would pass 4% of the signal at 400 cps (cycles per second), 40% at 2000 cps, and 90% at 6000 cps. The circuit formed by capacitor 64, resistor 66, and load resistor 65 in the compensation pickup lead branch is equivalent to the high pass filter.

Attention is also directed to the diode 72 in the feedback loop of the operational amplifier 56. When the signal received by the differential amplifier (−) input terminal is negative relative to a reference level, the diode is forward biased, the feedback resistance is very low, and the gain at the operational amplifier 56 is very low whereupon the negative input signal is not amplified. However when the input to the (−) input terminal of operational amplifier 56 is positive, the diode 72 is back biased raising the feedback resistance and the gain of the operational amplifier 56 whereupon the input signal is amplified.

A first test point, designated TP-1 in FIG. 2, is the point at which noisy signals such as those shown in FIG. 4 may be observed. Similarly the representative signal of FIG. 5 at test point TP-2 was clamped by diodes 75 and 77 (which do not conduct negative pulse signals or signals of more than +0.7 volts such as might be caused by switching transients and noise) and was amplified by operational amplifiers 56 and 74. The actual signal with some slight residual uncompensated noise, is shown in FIG. 6. The diode 75 also serves to provide a path of conduction when the feedback diode 72 is forward biased. The resistor 79 connected to clamping diode 77 serves to terminate the input to the (+) terminal of operation amplifier 56 and to aid the circuit in comming up to operation when the power is turned on. Incidentally both of the operational amplifiers 56 and 74 as shown in FIG. 2 may, for example, be of the types known as TL072 or LS353 operational amplifiers, and which are available from a number of manufacturers. Incidentially, the comparators 80 and 82 to be discussed below may, for example, be of type LM393. The high and low voltages for the system may, by way of example but not limitation, be either the commonly available plus and minus five volts or plus and minus twelve volts. However it has been determined that the higher the voltages, within limits, the more effective the circuit becomes.

The comparators 80 and 82 each have one input terminal (−) connected to receive the amplified output pulse from operational amplifier 74 and the other input terminal (+) coupled to receive reference signals VREF-1 and VREF-2 respectively. Thus an output pulse from comparator 80 is fed to the D input terminal of flip-flop 76 after it is processed and limited by the clamping diode 81 and pull up resistor 83. Incidently, the flip-flops 76 and 78 may, for example, be of the type LS74. Similarly the output of comparator 82 is fed to the D input terminal of flip-flop 78 after it is processed and limited by clamping diode 85 and pullup resistor 87.

In operation the hysteresis portion of the circuit of FIG. 2 which includes flip-flops 76 and 78 evaluates the pulse level on the output lines from comparators 80 and 82 during gate pulse or clock pulse $\overline{LED}$ and stores it as data depending upon the levels of the signals. For example if the levels of the signal on these two output lines are both higher in amplitude than the reference voltages VREF-1 and VREF-2 (noninterrupted beam) such as at time $t_1$ in FIG. 6 or both lower in amplitude than the referenced voltages VREF-1 and VREF-2 (interrupted beam) such as at time $t_3$ that state of the data is stored in the flip-flops 76 and 78 and used as the output data Q and $\overline{Q}$ on output lines 92 and 94.

If however the state of two signals from comparators 80 and 82 are not both low or both high relative to the reference voltages VREF-1 and VREF-2, such as at time $t_2$ (as might occur if a beam is only partially interrupted), the states of the flip-flops typically stored by an external data receiver (not shown) from the preceding scan or beam would typically be used.

Figure 7:
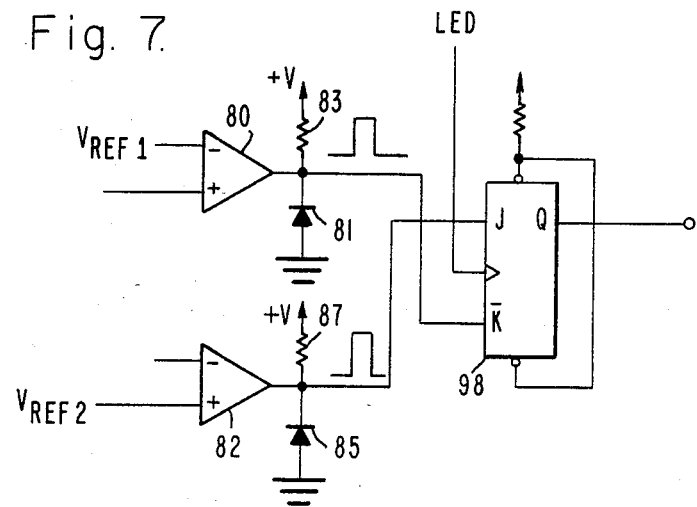
FIG. 7 is a schematic drawing of a second embodiment at the hysteresis portion of the circuit.

Similarly a hysteresis circuit can be implemented with a single J-K flip-flop 98 such as an LS 109 in the manner illustrated in FIG. 7. In this embodiment, if the inputs to the J input and the $\overline{K}$ input to the flip-flop 98 are both low, the output Q is low. If however the signal to the J and $\overline{K}$ inputs are both high the output Q is high. However if the signal of the J input is low and the signal to the $\overline{K}$ input is high the output signal Q remains in its stored state from the preceding beam. Moreover if the signal of the J input is high and the input signal to the K input is low the flip-flop cannot toggle and the output Q will remain in the same state it was in from the preceding beam.

Consequently, if the finger should move only slightly, such as might occur as a result of a slight finger tremor, and result in pulses such as the times $t_2$, $t_3$, $t_{n+1}$ and $t_{n+2}$ shown in FIG. 6, the state of the circuit of FIG. 2 will indicate or, in the case of FIG. 7, will remain stable in response to such slight irregular movements. At the same time the circuit will be able to rapidly detect the desired finger movements. Of course such transient conditions could also be caused by partial eclipsing of the beam by a finger, low level uncompensated electromagnetic noise signals, and slight variations in the level of ambient light.

Figure 8:
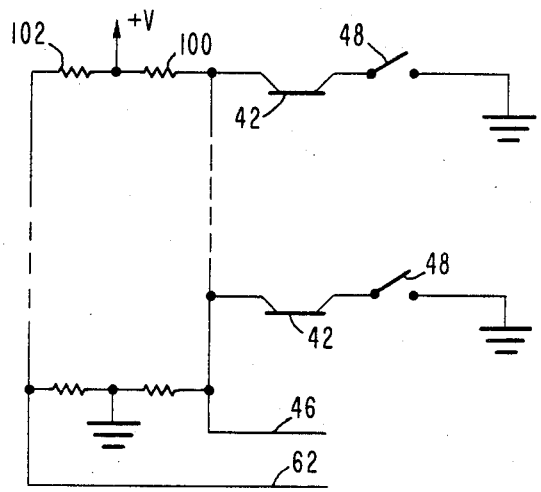
FIG. 8 is a schematic of a second embodiment of the detection portion of the circuit of FIG. 2.

In addition while the photodetector circuit of FIG. 2 shows one type of circuit it is possible to use another type illustrated in FIG. 8 such as load resistors 100 and 102 coupled between the collector of each phototransistor 42 and in common to the lead 62. The emitters of phototransistors 42 are switched to ground to select the desired beam. These load resistors 100 and 102 would be tapped with a reference voltage +V: such as 5 volts, with the last load resistor tapped to ground. The collectors of each of the phototransistors 42 are ganged to the lead 46 so that a negative going pulse is produced in response to an unblocked beam when the switches 48 are sequentially closed.

While the circuit of FIG. 2 has been described as generating and processing positive going phototransitor output pulses 52 it is possible to handle negative going output pulses 52 that would be produced by the circuit of FIG. 8 by reversing the polarity of clamping diodes 75 and 77 and feedback diode 72.

In summary, in the appended drawings and the foregoing detailed description, one preferred embodiment of the invention has been described. It is to be understood that minor variations in the implementation of the invention are contemplated. For example, alternative forms of output circuitry, and circuits for the differential combining of the signal and compensating noise voltage signals, may be utilized; and the invention is applicable to other systems including parallel output photosensitive elements. Accordingly, the present invention is not limited to that precisely as shown in the drawings and described hereinabove.

What is claimed is:

1. An interference reduction circuit comprising:
   means for providing at least one pair of light emitting devices and photodetectors each disposed along a light beam path extending therebetween;
   a photodetector output circuit;
   switching means for successively coupling the output of said at least one photodetector to said photodetector output circuit;
   an electromagnetic noise compensation pickup circuit extending generally coextensively with and electrically balanced with said photodetector output circuit; and
   circuit means including combining means for differentially combining the outputs from said photodetector output circuit and said electromagnetic noise compensation pickup circuit to substantially eliminate the electromagnetic noise component present on the output signal of said photodetector output circuit.

2. a circuit as defined in claim 1 in which said circuit means comprises pulse forming circuitry and means responsive to the output from said combining means for forming a pulse signal corresponding to such output signal.

3. A circuit as defined in claim 2 in which said circuit means further comprising hysteresis type circuitry, and means for selectively changing the state of said hysteresis type circuitry only when there is a change in the state of successive output signals of a photodetector, from about a full light beam reception state to a state in which the successive light beam reception is about fully interrupted, and vice-versa.

4. A circuit as defined in claim 1 further comprising a high pass filter circuit means disposed to conduct signals from said photodetector output circuit and said electromagnetic noise compensation pickup circuit to said combining means, whereby the effects of variations in signal level which have a rate of change higher than the normally expected rate of change in the level of ambient light is so conducted.

5. A circuit as defined in claim 1 wherein said combining means is an operational amplifier having diode feedback means disposed between the output and input thereof for increasing the amplification of photodetector output pulses which are of a predetermined polarity and for significantly reducing the amplification of pulses of the opposite polarity.

6. A circuit as defined in claim 1 wherein said electromagnetic noise compensation pickup circuit is an electrically equivalent circuit to said photodetector output circuit.

7. A circuit as defined in claim 2 wherein said electromagnetic noise compensation pickup circuit is a loaded lead line which is electrically equivalent to said photodetector output circuit.

8. A circuit as defined in claim 3 wherein said circuit means includes comparator means for comparing the level of the output signal from said combining means and actuating said hysteresis type circuitry to change states in response to each output signals only when the level of such output signal changes from greater than a first reference level to less than a second reference level and vice-versa.

9. A circuit as defined in claim 3 wherein said hysteresis type circuitry includes at least one flip-flop disposed to receive and store a signal corresponding to the change in the level output signal from said combining means and to remain in its previous stored state when the light beam reception state is between about full light beam reception and interruption.

10. A circuit as defined in claim 3 wherein said hysteresis type circuity includes two flip-flops disposed to receive and store a pair of signal coresponding to the change in the level of the output signal from said combining means to store first condition signals if the light is about fully interrupted, second condition signals if the light beam is about fully received, and third condition signals if the light beam condition is therebetween.

11. A circuit as defined in claim 1 further comprising hysteresis type digital storage circuitry, and means for selectively changing the state of said hysteresis type circuitry only when there is a change in the level of the output signals of said photodetectors between successive couplings thereof from close to a full light beam reception state to a state where the next successive light beam reception is close to fully interrupted, and vice-versa.

12. A circuit as defined in claim 2 further comprising high pass filter ciruict including a capacitor and resistor coupled in series and a shunting load resistor all disposed along a circuit path between said photodetector output circuit and said combining means, whereby the conduction of signals corresponding to changes in the level of ambient light at the rates of changes which ambient light is expected to change is effectively eliminated.

13. A system as defined in claim 8 wherein said circuit means includes clamping diode means coupled to inputs of said hysteresis type circuitry for setting the first reference level and the second reference level.

14. A system as defined in claim 10 wherein said light emitting devices are infrared light emitting diodes.

15. A system as defined in claim 11 wherein circuit means includes compartor means for controlling the state of said hysteresis type digital storage circuitry in response to output signals from said pulse forming circuitry such that the hysteresis circuit indicates a first reception state if, on successive couplings, the level of the input signal thereto remains greater than the levels of two reference signals operatively applied thereto, remains the same if the level of such output signal moves between the two reference level signals, and indicates a second beam reception state if the level of such output signal moves from greater than the first reference level to less than the level of the two reference signals and vice versa.

16. A system as defined in claim 11 wherein said hysteresis type storage circuitry includes at least one flip-flop disposed to receive and store a signal state corresponding to the last change in the level of the output signal from said combining means.

17. A system as defined in claim 11 wherein said hysteresis type storage circuitry includes two flip-flops disposed to receive and store a signal state corresponding to the last change in the level of the output signal from said combining means.

18. A light beam responsive circuit with interference reduction circuitry comprising:
means for providing a plurality of pairs of photoemitters and photodetectors each pair being disposed in spaced apart relationship on a beam path and about the periphery of a face plate;
a photodetector output circuit;
switching means for successively coupling the outputs from a plurality of said photodetectors to said photodetector output circuit;
compensation pickup circuit disposed substantially coextensively with said and electrically balanced with said photodetector ouptut circuit; and
means coupled to differentially combine signals from said phototector output circuit and said compensation circuit to substantially eliminate electromagnetic noise which is present on said photodetector output circuit.

19. A circuit as defined in claim 18 further comprising hysteresis type digital storage circuitry, and means for selectively changing the state of said hysteresis type circuitry only when there is a change in the state of photodetectors on sucessive couplings, from at least about a full light beam reception by a photodetector state to situations where the successive light beam reception state by such photodetector is at least about fully interrupted, and vice-versa and said hysteresis type circuitry remains in its stored state resulting from the previous coupling when the light beam reception is between these two conditions.

* * * * *